June 9, 1925.

O. L. BARNEBEY ET AL 1,541,099

PROCESS FOR THE MANUFACTURE OF ACTIVATED MATERIAL

Filed March 19, 1919    5 Sheets-Sheet 1

INVENTORS:
O. L. Barnebey
M. B. Cheney.

June 9, 1925.
O. L. BARNEBEY ET AL
1,541,099
PROCESS FOR THE MANUFACTURE OF ACTIVATED MATERIAL
Filed March 19, 1919   3 Sheets-Sheet 2
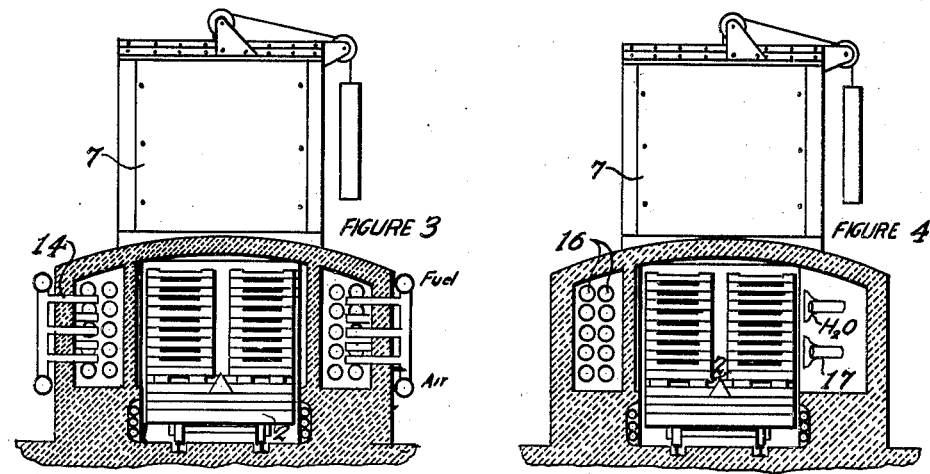
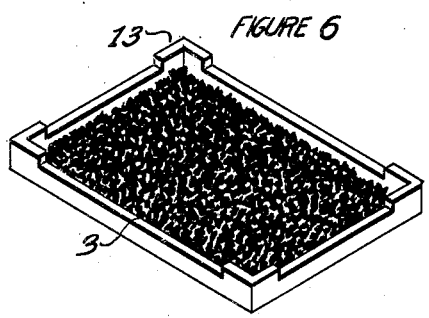
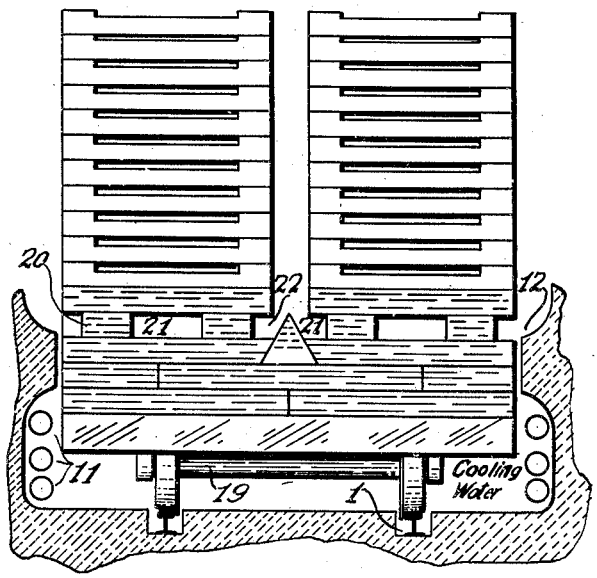
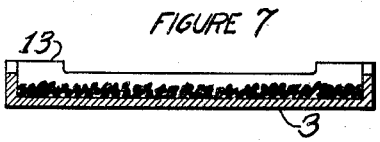
INVENTORS:
O. L. Barnebey
M. B. Cheney June 9, 1925.

O. L. BARNEBEY ET AL 1,541,099

PROCESS FOR THE MANUFACTURE OF ACTIVATED MATERIAL

Filed March 19, 1919   5 Sheets-Sheet 3

INVENTORS:
O. L. Barnebey
M. B. Cheney

June 9, 1925.

O. L. BARNEBEY ET AL 1,541,099

PROCESS FOR THE MANUFACTURE OF ACTIVATED MATERIAL

Filed March 19, 1919     5 Sheets-Sheet 4

INVENTORS:
O. L. Barnebey
M. B. Cherry

June 9, 1925.
O. L. BARNEBEY ET AL
1,541,099
PROCESS FOR THE MANUFACTURE OF ACTIVATED MATERIAL
Filed March 19, 1919   5 Sheets-Sheet 5
FIGURE 15
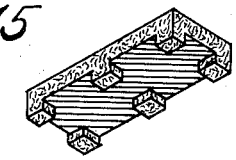
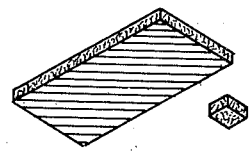
FIGURE 16
FIGURE 13
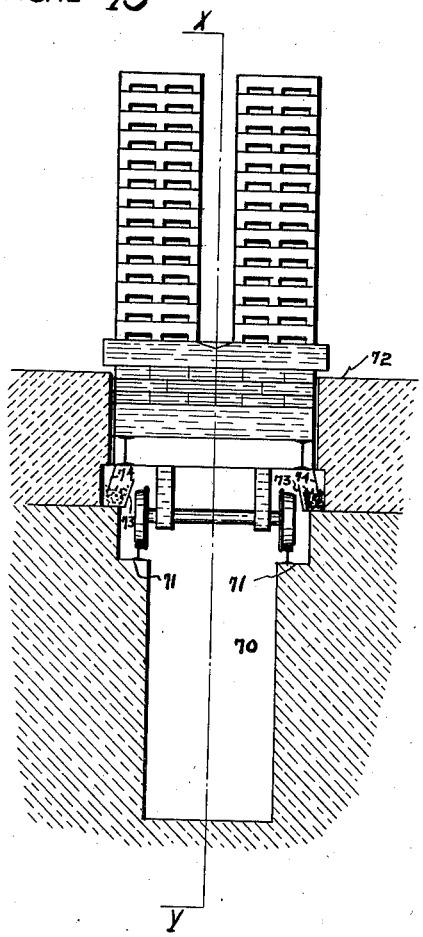
FIGURE 14
SECTION XY
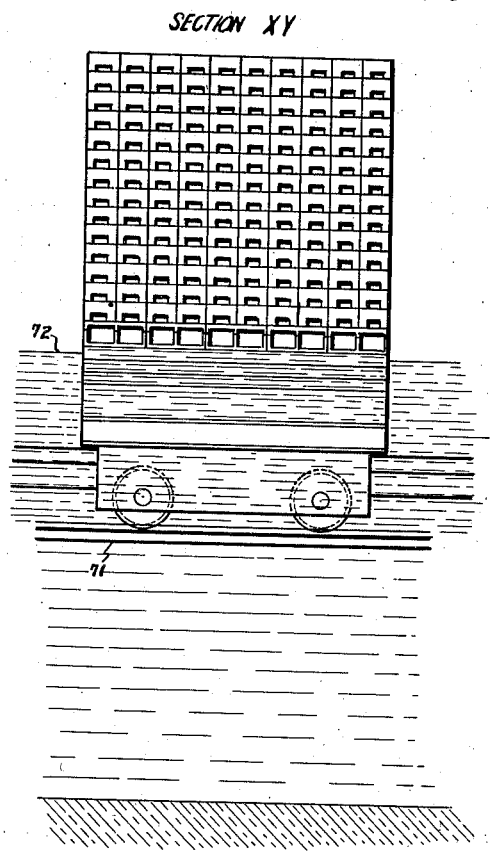
INVENTORS:
O. L. Barnebey
M. B. Cheney.

Patented June 9, 1925.

1,541,099

UNITED STATES PATENT OFFICE.

OSCAR L. BARNEBEY AND MERRITT B. CHENEY, OF CLEVELAND, OHIO; JOSEPHINE B. CHENEY ADMINISTRATRIX OF SAID MERRITT B. CHENEY, DECEASED; SAID JOSEPHINE B. CHENEY, AS ADMINISTRATRIX, ASSIGNOR TO SAID BARNEBEY.

PROCESS FOR THE MANUFACTURE OF ACTIVATED MATERIAL.

Application filed March 19, 1919. Serial No. 283,639.

*To all whom it may concern:*

Be it known that we, OSCAR L. BARNEBEY and MERRITT B. CHENEY, citizens of the United States, and residing at Cleveland, Ohio, have invented certain new and useful Improvements in Processes for the Manufacture of Activated Material, of which the following is a specification.

This invention relates to the manufacture of absorptive material, more particularly to the treatment of carbonaceous material, which may be either natural carbon, prepared carbon, or either natural or prepared carbon treated with materials such as certain chemicals to produce certain specific properties, improved activation, or both.

Heretofore it has been known that carbon can be treated with steam or carbon dioxide to increase its absorptive capacity. Up to the present time only steam activation has been utilized on a manufacturing scale.

At the present time, charcoal is activated in vertical tubes, about 7 inches in diameter, made of "nichrome" alloy, the charcoal being fed in at the top and withdrawn at the bottom. The nichrome tube is externally heated to as high a temperature as is possible, commensurate with the stable existence of the nichrome tube. Through an inner tube steam is introduced into the charcoal, and at the temperature of operation, approximately 900° C.; the steam reacts in part with the charcoal to produce what is known as "activated charcoal." Other furnaces, such as require the use of a revolving tube, or the use of an inclined hearth, have been proposed. In furnaces of these types the material being activated is kept in continuous motion, thus producing a stirring effect.

The vertical 7 inches treater has a very limited capacity and to get the capacity which it now possesses requires the conduction of heat through the carbon, which is highly insulating in character, to a depth too great to be practicable. This treater has the serious disadvantage of having the essential parts made of metal which deteriorates rather rapidly.

The use of the revolving furnace introduces the same objection as the vertical treater, provided the tube is filled with any considerable depth of material and has furthermore the disadvantage of requiring a considerable amount of machinery to produce revolution. This furnace also has the essential parts constructed of metal which introduces the factor of rapid deterioration and hence renewal of essential material.

The only inclined furnaces proposed heretofore have the serious disadvantage of requiring the layers of carbon on the hearth to be uneven in thickness.

In the three types of furnaces mentioned above, the movement of the carbon in the process produces more or less abrasive effect on the carbon during activation, thus grinding to some extent part of the charcoal, which in certain cases is objectionable.

The fundamental principles of this invention involved certain theoretical considerations. First of all, to make carbon highly absorbent in its behavior it must be treated in such a manner as to give the carbon the greatest available surface area to be exposed or available for action. To bring about this effect the carbon is caused to react with a gas in such a manner as to remove a portion of the carbon, or carbonaceous material contained in it, and leave pores or spaces in the residual material to give the remaining carbon its absorbing qualities. In previous work, attempts were made to maintain as high a temperature as possible, the only limits being the life of the materials of furnace construction. At these high temperatures the reactive gas burns away the material from the outer surfaces of the carbon before the gas has time to penetrate into the interior of the particles for reaction; hence, the operation resulted in an inferior quality of product, accompanied by a high loss of material. At these high temperatures use has been made of the so-called water-gas reaction, namely the reaction between carbon and water which produces water-gas, which is a mixture of carbon monoxide and hydrogen in equimolecular proportions, illustrated thus: $C+H_2O=CO+H_2$. In our invention this action is detrimental. The reaction found most favorable in our discovery when water is used does not yield water-gas, i. e., carbon monoxide and hydrogen, but yields carbon dioxide and hydrogen, illustrated thus: $C+2H_2O=CO_2+2H_2$. This reaction is brought about at relatively low temperatures.

Some of the $CO_2$ produced in the reaction slowly reacts with the carbon but this reaction is very secondary when water is present in excess in the reactive gas. In other words the temperature of reaction is maintained sufficiently low to favor the slow reaction of water with carbon to give $CO_2$ and $H_2$ as primary reaction constituents rather than $CO$ and $H_2$. When combustion gases only are used as reactive gas the reaction is carried out at sufficiently low temperatures to give a slow reaction. If the temperature in this case is too high here also detrimental results are obtained.

In this invention regardless of the nature of the reactive gas the temperature is so regulated as to give a slow reaction which gives the highest activation of the carbon with a minimum loss of material. In fact we have discovered that for best activation it is desirable to have as low a temperature as possible, and to arrange the material so as to permit the greatest freedom of movement of reactive gas. This is accomplished by arranging the material in thin layers or masses. The time of reaction is then sufficiently prolonged to obtain the maximum activation without undue loss of material. This process involves the treatment of material containing carbon in layers or masses. These layers or masses may be suspended or supported in the reactive gas or gases heated at the proper temperature. In general, it may be stated that the best results are obtained by having these layers uniform or even in thickness or the masses arranged in such a regular form as to give the uniform effect desired. The expression granular is used to define the character of the material treated and is meant to include pieces of material, whole or subdivided. If the whole piece, parts or grains of material are loose in texture they can be treated without any or with little subdivision. The physical state should be such that a considerable amount of space remains between the pieces, grains or particles available for gas circulation, such positioning allowing the activating gas to move with a certain amount of freedom thru the layer masses. The material should be small enough to permit the activating gases to penetrate uniformly but not fine enough to pack together densely and thus prevent penetration. The depth of layers of the material is regulated according to the size, shape and porosity of the material in order to insure penetration. While the above theoretical considerations best illustrate the fundamental considerations upon which this invention is based, the invention does not limit itself to the scope of the above definitions.

The heat may be applied by convection, conduction or radiation. The combustion gases may be circulated in the apparatus in such a manner as to give contact of the gases with the material containing carbon or the gas may be conducted from the apparatus without coming in contact with the material being activated or again a combination of these two effects may be utilized in this process of manufacture. Other reactive gas may be introduced into the apparatus along with the combustion gases or be used entirely separate from the combustion gas for the purpose of activating the material containing carbon. These gases may serve for reactive purposes and also may or may not convey the heat required for reaction by convection, conduction or radiation according to the specific application.

Heat may be supplied by direct or indirect combustion of solid, liquid, or gas fuel; by electrical means such as the application of the electrical resistance principle, or by any combination of these means for producing heat.

It must be understood that one of the distinctive features of the present process is the treatment of materials containing carbon while they are arranged in uniform layers or uniform masses. These layers or masses are relatively thin and are supported or suspended in the reaction gas by any convenient method.

The material may be contained in trays or baskets, solid or perforated, in such a manner as to allow circulation of the reactive gases used for activation. The thin layers allow the reactive gas to penetrate through the layers and also allow the ready escape of gaseous reaction products. Likewise these thin layers or masses being heated from all sides by the reactive gas, can be readily heated uniformly to the temperature desired, which is an additional advantage of this process.

The utilization of uniform layers or masses of material, superimposed, supported or suspended over or beside each other, is amplified in this process, to wide areas, thus giving the manufacturing plant large production capacity.

Material may also be formed in rigid shapes and arranged in the apparatus in such a manner as to give a considerable amount of void space, which allows the subsequent circulation or penetration of reaction gas or gases throughout the entire mass of material being treated. This and other similar methods involve the layer principle claimed herein because here also the actual distance required for the reactive gases to penetrate through the mass is relatively small.

Due to the fact that the material containing carbon is treated in a uniform manner, a higher quality of material is produced by this process than by any other process now known.

The apparatus or machine which is used in the present process is illustrated more or less diagrammatically in the accompanying drawings in which:

Fig. 3 is a transverse cross-section through the kiln in the region of the burners.

Fig. 4 is a transverse cross-section through the kiln near the front end of the combustion chamber.

Fig. 5 is an elevation of a car loaded with trays, with the lower part of the tunnel kiln shown in cross-section.

Fig. 6 is an isometric view of one of the trays loaded with charcoal.

Fig. 7 is a longitudinal vertical cross-sectional view of the tray shown in Fig. 6.

Fig. 13 is a transverse cross-section of another modification, using a sand seal, and illustrates a truck loaded with a stack of blocks of carbonaceous material.

Fig. 14 is a longitudinal view of same.

Fig. 15 is an isometric view of a single block of the type shown in Figs. 13 and 14.

Fig. 16 is an isometric view of a single carbon block of the type shown in Figs. 13 and 14 differing from Fig. 15 in that a supporting block is separate from the main carbon block.

Figure 1:
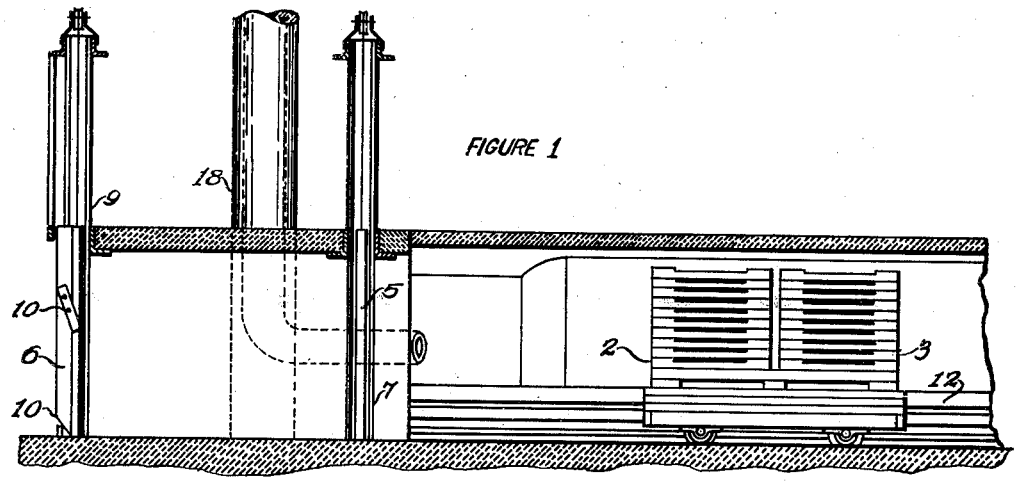
Fig. 1 is a side elevation in longitudinal cross-section of the rear end of one form of kiln.
Figure 2:
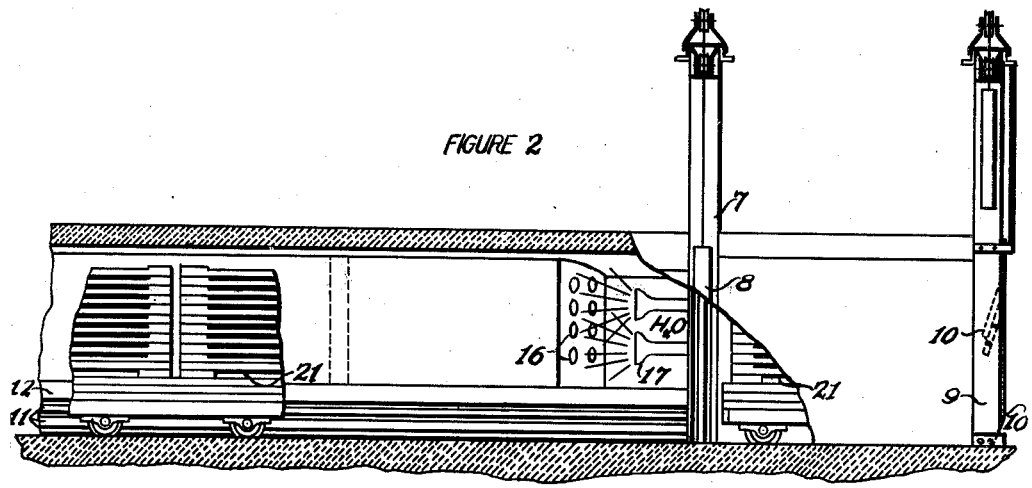
Fig. 2 is a side elevation in longitudinal cross-section of the front end of the kiln.
Figure 8:
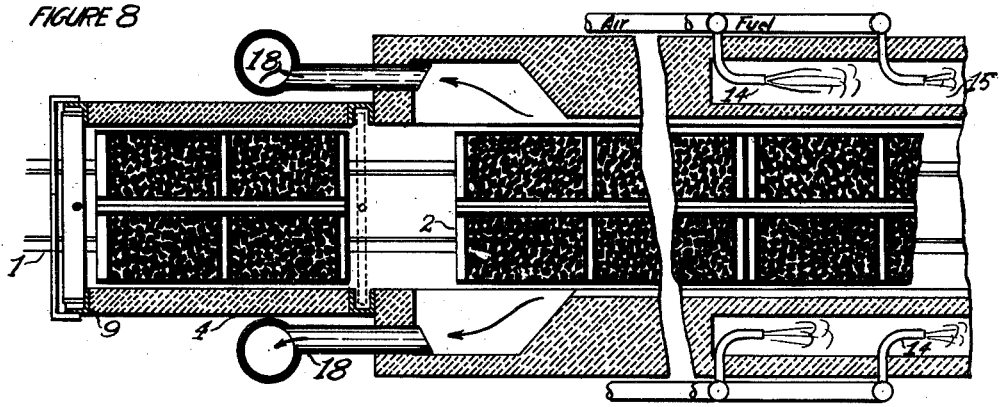
Fig. 8 is a plan view in cross-section of the rear end of the kiln.
Figure 9:
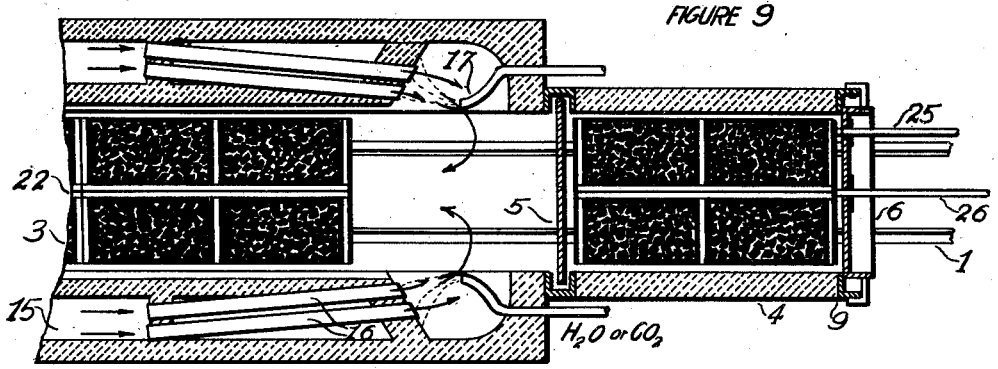
Fig. 9 is a plan view in cross-section of the front end of the kiln.

The apparatus consists essentially of a continuous movable-bottom furnace. Cars loaded with the material are moved continuously through the furnace while the same is being heated sufficiently to maintain the reactive gases or the carbon-containing material at the proper temperature for activation. Instead of using cars of the type described and illustrated, a movable belt or belts containing a continuous layer or layers of material could be used or a discontinuous layer or layers produced by boxes or trays mounted on a belt or so linked together as to give a movement similar in principle to the cars, could be used.

Instead of moving the material, a travelling flame could be utilized thus changing the point of application of heat in a continuous or discontinuous manner.

The heat may be applied to the material in various ways. The furnace may be of the closed muffle type so as to separate the combustion gases entirely from the material going through the furnace, or it may be constructed in such a manner as to allow part or all of the combustion gases to enter the reaction chamber of the furnace and to come into contact with the material being activated.

Combinations of these effects may be used to advantage. For instance, the combustion gases may be vented into the reaction chamber and passed through the same in a direction parallel to the direction of the moving cars or furnace bottom thus accomplishing two desirable results—heating the cars and furnishing carbon dioxide and steam (if hydrocarbons are being burned) for activation. If the furnace is very long, the gases from the combustion chamber may be too cool to heat up the cars as they enter, but may be used to cool the cars at the exit end of the furnace and to furnish carbon dioxide or steam for activation, or either of these objects may be accomplished.

The heat may be produced by combustion of solid fuel, such as coal, either lump or powdered; by combustion of liquid fuel such as oil, continuously supplied as a stream of liquid, sprayed or atomized; or by the burning of gaseous fuel such as natural gas, water gas, producer gas etc. The fuel may be hand or machinery stoked, injected by air blast, or supplied in any other convenient manner. It may be added to the furnace through one or more intakes or burners. A long continuous combustion chamber or a series of shorter chambers may be used for burning the fuel in supplying the heat. Connections may be made directly from the combustion chamber to the reaction chamber so that the reaction gases may in whole or in part move directly into the reaction chamber. In fact, there need not necessarily be separate combustion and reaction chambers in the furnace. A wall may only partially separate the two in such a manner as to give for all intents and purposes a uniform reaction furnace in which occurs the combustion of the fuel and the treatment of the material with reactive gas. The wall, if necessary, can be completely removed and still the installation be so adjusted that the reactive gas can be heated to the proper temperature for activation. Especially is this true with the use of surface or flameless combustion.

Instead of using fuel as a source of heat, the heating may be accomplished by electrical means. Should electrical carbon resistance be used for source of heat it must be protected from the reactive gases or considerable loss will occur due to reaction with the gases at the temperature produced or a continuous supply of carbon material added to replace that lost by the reaction.

Advantage can be gained by using a recuperative system at either or both ends of the furnace. The recuperation is accomplished by the movement of air or water through ducts or pipes. By this method the moving material can be more rapidly cooled at the exit end of the furnace, so that the tunnel may be shortened. The hot air can be used for combustion in the furnace, for generating steam, or can be applied to any other useful purpose. The hot water may be injected directly into the furnace through injectors or atomizers to furnish part or all of the steam used for activation.

Water may be injected directly into the furnace at such positions as will give the best effect and especially at or near the exit end of the furnace, in which case it accomplishes a two-fold purpose—it cools the material and containers before the exit from the furnace and also it vaporizes into steam to make in whole or in part the reactive gas necessary for activation. The water may be introduced at appropriate places directly into the kiln or combustion chamber in order to diminish any tendency to give too high a temperature in the furnace. By adding the water in this manner, a much more uniform temperature gradient can be obtained throughout the reactive region of the furnace.

Steam may also be introduced to produce the same general conditions as produced by water. Any other reactive gas may likewise be introduced at a cooler temperature into the furnace at the position of maximum heat production, thus lowering the temperature at the particular points or positions desired.

The activated carbon or carbon-containing material manufactured by this process has many valuable properties. It may be used for the absorption of many gases, including the poison gases used in warfare, for the dehumidifying of air, in absorption towers alone or with the addition of other substances. It can be used for clarifying solutions, such as clarifying of sugar, molasses or similar syrups, removing coloring matter from water or solutions of various kinds including medicinals. It may be used for the reduction of many chemical substances, especially those containing oxygen. For this reason it has many applications in metallurgy. If added to molten metals it removes the oxygen more completely than ordinary carbon. Its affinity for oxygen and nitrogen makes it a very excellent agent for the production of vacua, hence this material is very valuable for the evacuation of electric lamps in their manufacture. It is an excellent catalyst for many chemical reactions such as the oxidation of $SO_2$ to $SO_3$, $NO$ to $NO_2$, etc.

Its chemical reactivity is much greater than any ordinary carbon, hence activated carbon or material containing it has a large field of adaption and use in manufacturing.

Referring now more specifically to the drawings, Figs. 1 to 9 represent one form of kiln, suitable for carrying out the process, this form being characterized principally by the arrangement of separate combustion chambers along the sides of the kiln, from which the hot gases enter the kiln at its front end and leave the same at its rear end.

The kiln consists of a tunnel provided with a pair of rails 1 for conveying cars 2 which carry stacks of pans 3 for receiving the material to be activated.

At each end of the tunnel is a vestibule 4 provided with an inner door 5 and an outer door 6.

The inner door 5 is constructed of asbestos with suitable metal braces, and moves vertically in guideways 7, which are made gas-tight by suitable metal casings. A counterweight 8 is arranged in the manner shown, which also serves as a means for raising and lowering the door.

The outer door 6 is also constructed of asbestos and suitable metal braces, and moves in guideways 9. In order to secure a gas-tight closure for the outer door, so as to prevent gases from escaping from or entering into the tunnel, a pair of wedges 10 are arranged at the sides of this door, and another pair at the lower corners. The guideways are provided with inclined abutments for receiving these wedges so that when the door is lowered, it automatically sets itself securely against the framework.

Throughout its entire length, the tunnel is divided horizontally into an upper and lower compartment. The upper compartment contains the stacks of pans with charcoal or carbon blocks, and through it the hot gases are passed for activation. The lower compartment contains cooling tubes 11 through which air or water may be passed in order to keep the metal parts of the trucks cool. After the air or water leaves these tubes it may be passed into the combustion chamber or into the front end of the tunnel. Between these two compartments are arranged a pair of projecting ledges 12, which make close contact with the sides of the cars so that when the tunnel is entirely filled with cars there will be very little communication between the upper and the lower compartments. This is necessary in order to keep the two compartments at widely different temperatures.

The air and fuel are introduced by means of burners 14 located near the central portion of the furnace. Either solid, liquid, or gaseous fuel may be used. Combustion occurs in a pair of combustion chambers 15 arranged along the sides of the furnace, and from these combustion chambers the gases leave through the tubes 16 and enter the tunnel. At the point where the hot gases leave the combustion chamber they are mixed with jets of water, steam or carbon dioxide from the nozzles 17. These nozzles are directed against the heated walls of the furnace so as to insure immediate vaporization of the water. After passing through the tunnel from the front to the rear end, the gases are led out into chimneys 18.

The car for carrying the trays with the material consists of a metal truck 19, a fire-brick superstructure 20. Near the upper portion of this superstructure a number of air passages 21 are provided, which open into a central longitudinal opening 22. The trays are arranged in vertical stacks slightly spaced from each other, so as to permit circulation of gases on all sides.

The position of the car in the vestibule may be controlled by a hooked rod 25 which may be passed through an opening in the outer door 6. A power-operated pusher bar 26 is also provided for the purpose of gradually moving the cars through the kiln.

The pans 3 are provided with elevated corners 13, so as to provide spaces between the same for circulation of the gases.

Figure 10:
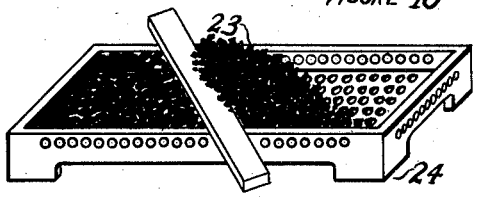
Fig. 10 is an isometric view of a modified form of tray, shown in the process of filling.

In Fig. 10 is shown an improved form of pan 23 which has projecting corners 24 on the bottom thereof. The upper periphery of the pan lies in a single plane, so that it can be very easily filled by passing a level over it in the manner shown. In some cases it is also advantageous to perforate the pan so as to permit more thorough penetration of the gases.

Figure 11:
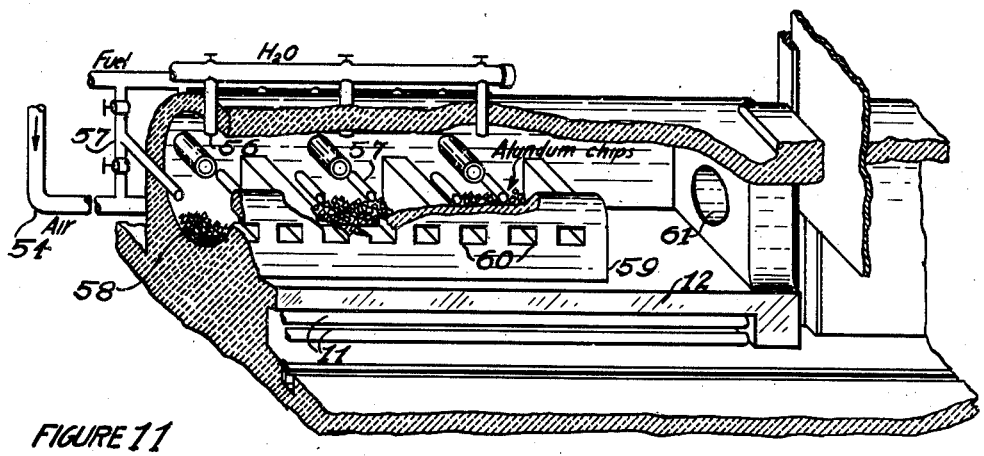
Fig. 11 is an isometric view of a fragment of the front end of a modified form of kiln.
Figure 12:
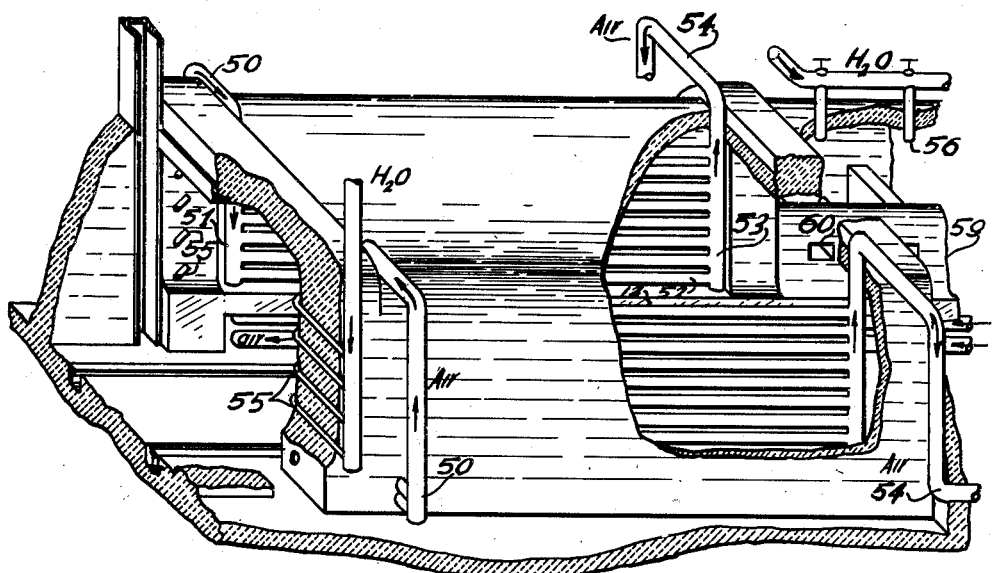
Fig. 12 is an isometric view of a fragment of the rear end of the kiln shown in Fig. 11.

Figure 11 and 12 show a modified form of construction, in which there is free communication between the combustion chambers and the tunnel along the greater portion of the length of the tunnel.

In this modification the rails and trucks with the trays are the same as in the preceding case, and a vestibule with sliding doors is provided at each end of the tunnel. The space within the tunnel is also divided into two compartments separated by the platforms of the trucks and the projecting ledges 12.

At the sides of the lower compartment are a number of cooling tubes as in the previous form, but these tubes are connected at the front end of the kiln by means of tubes 50 with a pair of manifolds 51, one at each side of the tunnel. These are connected by a number of tubes 52 with another manifold 53, from which the gases are led to the burners by intermediate tube sections 54. Air is drawn or forced into the tubes 11 by any suitable means, and during its passage through the tubes 11 and 52 it serves to cool the trucks and the pans respectively. In the meantime the air becomes heated and is therefore, well adapted for purposes of combustion. Obviously, there may be provided additional water pipes for cooling the lower truck frame if the air is not sufficient for this purpose.

In the neighborhood of the cooling tubes 52 there are provided a number of nozzles 55 for introducing water, steam or carbon dioxide into the front end of the tunnel. The ends of these nozzles are directed upwards in order to cause circulation of the gases. Additional nozzles 56 are provided at the front end of the kiln and also at intermediate points so that water or gas may be introduced wherever and in whatever position desired.

The cooling tubes occupy about a third of the length of the tunnel and are at the rear end thereof, i. e., the end where the cars leave the tunnel. Throughout the remainder of the length of the tunnel are distributed a number of burners 57 which may be fed with either solid, liquid or gaseous fuel. These are directed inward and downward against beds 58 of alundum chips, which are arranged between the outer furnace walls and the tunnel. Between the tunnel and the beds 58 are longitudinal walls 59 extending about half the distance to the ceiling, and shaped so that they will deflect the products of combustion upward against the roof of the tunnel, from where they are directed into the layers or masses of material.

The walls 59 are provided at frequent intervals with inclined perforations 60 to permit ready circulation of the gases from the tunnel to the burners and back again.

At the extreme front end of the tunnel are provided two chambers 61, one at each side of the tunnel, for receiving the exit gases. From these chambers they are discharged into chimneys or elsewhere.

It is to be understood that in this, as well as in the preceding modification, suitable provision may be made for receiving pyrometers, manometers, and gas testers, such as are present on every furnace, these forming no part of the present invention.

In Figures 13 and 14 is shown a modified form of construction in which the upper and lower chambers are separated by a sand seal. 70 is a continuous passage under the truck, large enough to admit a man. 71 is a shelf for supporting the rails. 72 is the lower part of the furnace proper, which may be of any desired construction. At the lower portion of the truck are provided two sand-filled troughs 73, into which extend depending flanges 74, secured to the truck. These make continuous contact with the sand and prevent free circulation of air between the upper and the lower chambers. Fig. 14 is a longitudinal cross-sectional view of a loaded truck of the type also illustrated in Fig. 13.

It is sometimes desirable to activate the material in the form of solid blocks. Such blocks are shown in Figs. 15 and 16. The blocks have projections thus providing free air spaces so as to permit circulation of the gases. In Figure 15 the projections are component parts of the block. In Figure 16 the projections take the form of separate supporting blocks. These blocks may be made by compressing finely divided carbonaceous material with a suitable binding material such as molasses, glue, tar, pitch, asphalt, etc. They may also be pressed from wooden blocks by means of dies of the desired shape.

In the operation of a manufacturing unit by this process, the proportions of the various gases used for this purpose may vary widely. The cheapest source of carbon dioxide is naturally the combustion gases resulting from heating the furnace. Water may be introduced into the furnace as a liquid preferably by atomizing or spraying, or may be introduced as steam, with or without previous superheating. For the same conditions of operation, steam has a more rapid rate of reaction than has carbon dioxide. Pure carbon dioxide can be used for activating carbon, but at present its application is limited, due to the cost of the pure substance.

The manufacture of activated carbon by this process proceeds at a lower temperature than is utilized by any steam activation process now in use. Whereas in previous steam activation work a temperature of above 900° C. has been found desirable, in our process a temperature of 900° C. or above is detrimental. While the process can be conducted at higher temperatures such operation of our process above 900° C. results in a higher percentage loss by weight of the material being treated.

The entire operation is performed with the gases under only such pressures as are normally produced in the particular furnaces by the injection of the combustion gases and steam and the regulation of flue conditions of the furnace. There is no special attempt made to produce abnormal pressures or evacuation. But it is preferable to have the furnaces under slight positive pressure in order to insure a uniform gas atmosphere being existent throughout the furnace.

The manner of carrying out the above process may be varied widely, depending upon the conditions of temperature, pressure, composition of reactive gases, and arrangement of the charcoal. A few examples will now be given for purposes of illustration, without, however, in any manner limiting ourselves to the details of these particular examples since wide variations may be made in the controlling factors and still effect the production of highly activated material by this process.

*Example 1.*

Uniform ¾ inch layers of charcoal derived from cocoanuts placed over each other in trays with spaces for gas circulation intervening are loaded upon cars and charged into a furnace as heretofore described. The reactive gas in this case consists of an atmosphere of 50% combustion gases and 50% steam by volume. The cars and material are heated gradually up to a temperature of 875° C. as they progress toward the center of the kiln. The cocoanut charcoal is then heated at 875° C. from an hour and a half to two hours in the activating atmosphere. After this treatment the materials, trays and cars are gradually cooled by progressively moving thru the cooling zone of the furnace toward the exit end, at which the car load of material is withdrawn and emptied. The charcoal is thus activated to possess a high adsorption value.

*Example #2.*

Other conditions same as under Example #1 except that the temperature of operation is 800° C. and the time of treatment from five to seven hours.

*Example #3.*

Maintaining a temperature of 875° C. and using a time of treatment of three to six hours, natural coal is highly activated in an atmosphere containing a mixture of steam and products of combustion.

*Example #4.*

At a temperature of 840° C. artificial carbon produced by retorting or by otherwise decomposing carbon-containing materials, is highly activated in an atmosphere of combustion gases and steam in periods varying from two to five hours.

*Example #5.*

Conditions same as in Examples 1, 2, 3, and 4 except that pure steam is used as reaction gas.

*Example #6.*

Conditions the same as in Examples Nos. 1, 2, 3 and 4 except that combustion gases are used as reaction gas.

By carbonaceous material as used in the specification and claims is meant to include charcoal, coal (anthracite and bituminous), wood, vegetable nuts, lamp-black, bone-black, oil shale and other carbon containing materials both natural and artificial.

In the following claims, the expression "quiescent" is used to define a condition where there is no movement of the particles relative to each other in a given layer. The material may move en masse, but by having no movement of the particles within the mass, the grinding action of the particles upon each other is prevented. Also, the expression "oxygenated" in the claims is used to designate gases of the type of $CO_2$ and $H_2O$ which contain oxygen combined with other elements and are thus distinguished from free oxygen.

Having now described our invention and the preferred manner of putting the same into practice, we wish it understood that we should not be limited to the specific examples and details of construction herein shown and described as it is obvious that these may be varied without departing from the spirit of the invention as indicated in the accompanying claims.

The expression "water in gaseous form" as used in the following claims is intended to cover steam in superheated, dry or saturated condition, water in atomized condition or mixtures of these.

We claim as our invention:

1. In an activating process, heating a thin layer of granular carbonaceous material at carbon activation temperatures, in the presence of similarly-heated, oxygenated, activating gases adapted to react endothermically with carbonaceous material, maintaining the temperature substantially uniform during the activation, introducing into the activating chamber cooler oxygenated gases containing practically no free oxygen, cooling the activated carbonaceous material therewith, and then heating said cooling gases to activating temperature and activating carbonaceous material therewith, the granules of said layer being substantially without intermotion during said process.

2. In an activating process, heating a thin layer of granular, carbonaceous material to a temperature not exceeding 900° C. in the presence of similarly-heated, oxygenated, activating gases adapted to react with carbonaceous material, maintaining the temperature substantially uniform during the activation for a period to insure substantially uniform activation of said material, effecting a partial, internal oxidation of said granular material by substantially uniform penetration of the activating gas throughout the carbonaceous material, introducing into the activating chamber cooler, oxygenated gases containing practically no free oxygen, cooling the activated carbonaceous material therewith and then heating said cooling gases and activating carbonaceous material therewith, the granules of said layer being substantially without intermotion during the said process.

3. In an activating process, heating layers of carbonaceous material at carbon activation temperatures, in the presence of similarly-heated, oxygenated, activating gases adapted to react with carbonaceous material, said layers being sufficiently thin and porous to allow free diffusion of the activating gases into and the reaction products out of the layers of carbonaceous material, maintaining the temperature substantially uniform during the activation for a period to insure substantially uniform activation of said material, effecting a partial internal oxidation of said granular material by substantially uniform penetration of the activating gases throughout the carbonaceous material, introducing into the activating chamber cooler oxygenated gases containing practically no free oxygen, cooling the activated carbonaceous material therewith and then heating said cooling gases to activating temperatures and activating carbonaceous material therewith, the granules of said layers being substantially without intermotion during said process.

4. In an activating process, uniformly heating to a temperature not exceeding 900° C. in the presence of similarly heated, oxygenated, activating gases adapted to react with carbonaceous material a plurality of thin and slightly separated layers of parts or pieces of carbonaceous material having size and shape to allow thorough penetration of the activating gases, maintaining the temperature substantially uniform during the activation, effecting a partial internal oxidation of said granular material by the activating gases, introducing into the activating chamber cooler activating gases containing practically no free oxygen, cooling the activated carbonaceous material therewith and then heating said cooler gases to activating temperatures and activating carbonaceous material therewith, the granules of said layers being substantially without intermotion during said process.

5. In an activating process, heating a thin layer of granular carbonaceous material to a temperature not exceeding 900° C., in the presence of similarly-heated steam, maintaining the temperature substantially uniform during the activation, introducing into the activating chamber cooler water in gaseous form and containing practically no free oxygen, cooling the activated carbonaceous material therewith and then heating said cooling gases to activating temperature and activating carbonaceous material therewith, the granules of said layer being substantially without intermotion during said process.

6. In an activating process, heating a thin layer of granular, carbonaceous material at carbon activation temperatures, in the presence of similarly-heated steam, maintaining the temperature substantially uniform during the activation for a period to insure substantially uniform activation of said material, effecting a partial, internal oxidation of said granular material by substantially uniform penetration of the activating gas throughout the carbonaceous material, introducing into the activating chamber cooler water in gaseous form and containing practically no free oxygen, cooling the activated carbonaceous material therewith and then heating said cooling gases and activating carbonaceous material therewith, the granules of said layer being substantially without intermotion during the said process.

7. In an activating process, heating layers of carbonaceous material at carbon activation temperatures in the presence of similarly-heated steam, said layers being sufficiently thin and porous to allow free diffusion of the activating gases into and the reaction products out of the layers of carbonaceous material, maintaining the temperature substantially uniform during the activation for a period to insure substantially uniform activation of said material, effecting a partial internal oxidation of said granular material by substantially uniform penetration of the activating gases throughout the carbonaceous material, introducing into the activating chamber cooler water in gaseous form and containing practically no free oxygen, cooling the activated carbonaceous material therewith and then heating said cooling gases and activating carbon therewith, the granules of said layers being substantially without intermotion during said process.

8. In an activating process, uniformly heating to a temperature not exceeding 900° C. in the presence of similarly-heated steam a plurality of thin and slightly separated layers of parts or pieces of carbonaceous material having size and shape to allow thorough penetration of the steam, maintaining the temperature substantially uniform during the activation, effecting partial internal oxidation of said granular material by the activating gases, introducing into the activating chamber cooler water in gaseous form and containing practically no free oxygen, cooling and activated carbonaceous material therewith, and then heating said cooling gases to activating temperatures and activating carbonaceous material therewith, the granules of said layers being substantially without intermotion during said process.

9. In an activating process, charring organic material, uniformly heating the resultant charred material in thin layers at carbon activation temperatures in the presence of similarly-heated, oxygenated, activating gases adapted to react endothermically with carbonaceous material, maintaining the temperature substantially uniform during the activation and effecting a partial internal oxidation of said granular material by substantially uniform penetration of the activating gases throughout the carbonaceous material, introducing cooler, oxygenated gases into the activating chamber and cooling activated carbonaceous material therewith, the granules of said layers being substantially without intermotion during said process.

10. In an activating process, charring organic material, uniformly heating the resultant charred material in thin layers at carbon activation temperatures in the presence of similarly-heated steam, maintaining the temperature substantially uniform during the activation and effecting a partial internal oxidation of said granular material by substantially uniform penetration of the activating gases throughout the carbonaceous material, introducing into the activating chamber cooler water in gaseous form and containing practically no free oxygen and cooling the activated carbonaceous material therewith, the granules of said layers being substantially without intermotion during said process.

11. In an activating process, introducing a thin layer of granular carbonaceous material into a substantially uniformly heated zone of a furnace, the temperature of said zone being at carbon activation temperatures, heating said granular carbonaceous material while in said zone in the presence of similarly-heated, oxygenated, activating gases adapted to react endothermically with carbonaceous material, moving the activated carbonaceous material from the said zone of the furnace to another portion of said furnace and subjecting the activated material to progressive cooling by means of cooler oxygenated gases containing practically no free oxygen and then heating said cooling gases to activation temperatures and activating carbonaceous material therewith, the granules of said layer being substantially without intermotion during said process.

12. In an activating process, introducing a thin layer of granular carbonaceous material into a substantially uniformly heated zone of a furnace, the temperature of said zone being at carbon activation temperatures, heating said granular carbonaceous material while in said zone in the presence of similarly-heated steam, moving the activated carbonaceous material from the said zone of the furnace to another portion of said furnace and subjecting the activated material to progressive cooling by means of cooler water in gaseous form and containing practically no free oxygen and then heating said cooling gases to activating temperatures and activating carbonaceous material therewith, the granules of said layer being substantially without intermotion during said process.

OSCAR L. BARNEBEY,
*Captain, C. W. S., U. S. Army.*
MERRITT B. CHENEY,
*1st. Lt., C. W. S., U. S. Army.*